(No Model.)
J. E. BLANTHER.
MANUFACTURE OF CONTOUR RELIEF MAPS.
No. 473,901. Patented May 3, 1892.
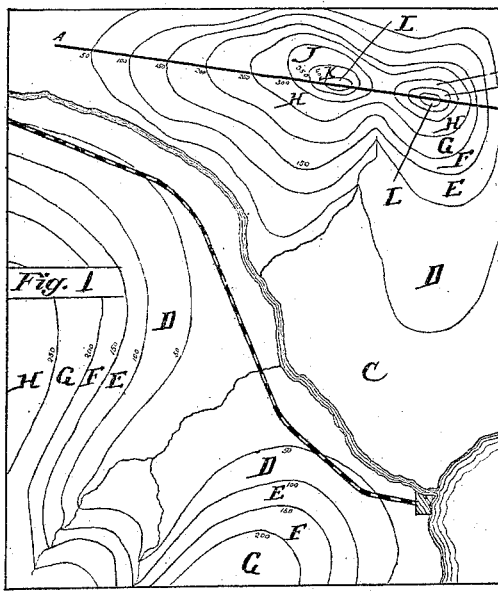
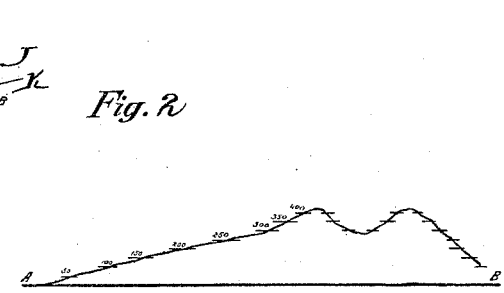
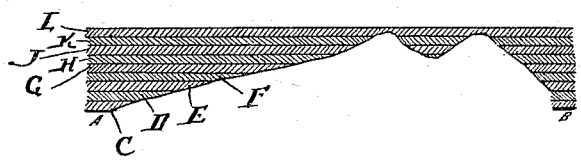
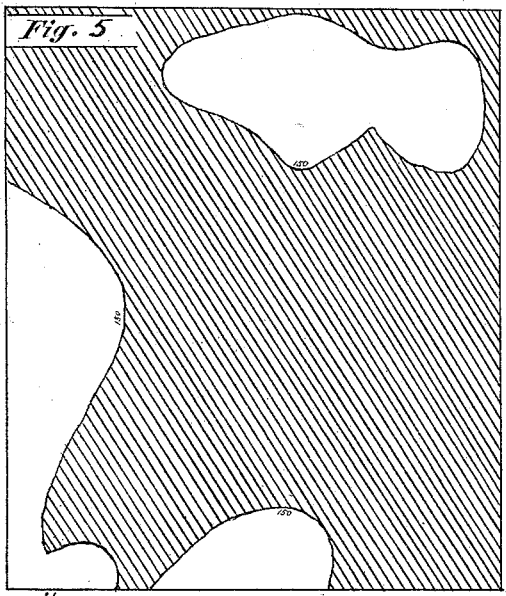
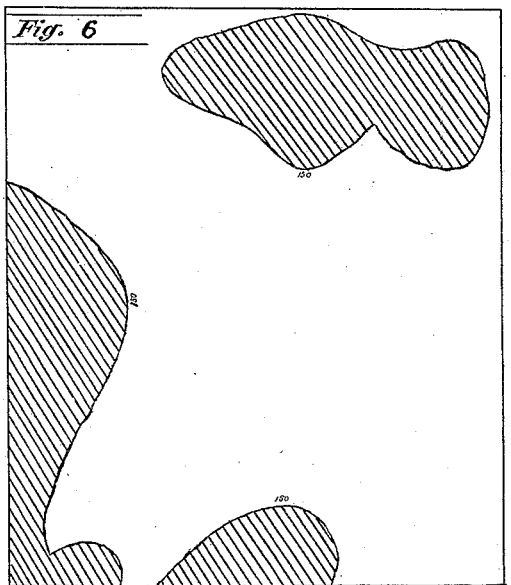
Witnesses:
Celeste P. Chapman
Davida J. Johnson
Inventor:
Joseph E. Blanther
by Bauert W. Parker,
Attorney.
THE NORRIS PETERS CO., PHOTO-LITHO., WASHINGTON, D. C.

UNITED STATES PATENT OFFICE.

JOSEPH E. BLANTHER, OF CHICAGO, ILLINOIS.

MANUFACTURE OF CONTOUR RELIEF-MAPS.

SPECIFICATION forming part of Letters Patent No. 473,901, dated May 3, 1892.

Application filed April 24, 1890. Renewed February 23, 1892. Serial No. 422,597. (No model.)

*To all whom it may concern:*

Be it known that I, JOSEPH E. BLANTHER, a subject of the Emperor of Austria and King of Hungary, residing at Chicago, in the county of Cook and State of Illinois, have invented a certain new and useful Improvement in Methods of Making Contour Relief-Maps, of which the following is a full, clear, and exact specification.

My invention relates to the method of making contour relief-maps.

The object of my invention is to provide convenient means for manufacturing or making relief-maps which shall accurately indicate the topographical peculiarities of the locality depicted by the map.

My invention is illustrated in the accompanying drawings, wherein—

Figure 1 is a plan view of a complete map made in relief or of an ordinary printed map with the contour-lines thereon. Assuming that Fig. 1 represents a relief-map, Fig. 2 is a section through the line A B. Fig. 3 is a section through one part of the mold made as hereinafter described. Fig. 4 is a section through the opposed part of the mold. Assuming that Fig. 1 is a view of the map not in relief, Fig. 5 is a view of the same with all the portions cut out except those representing territory having an altitude more than one hundred and fifty feet. Fig. 6 is a similar map with the sections having an altitude of less than one hundred and fifty feet left.

Like parts are indicated by the same letter in all the figures.

C is that portion of the flat map indicating altitudes below fifty feet; D, altitudes from fifty to one hundred feet; E, one hundred to one hundred and fifty feet; F, one hundred and fifty to two hundred feet; G, two hundred to two hundred and fifty feet; H, two hundred and fifty to three hundred feet; J, three hundred to three hundred and fifty feet; K, three hundred and fifty to four hundred feet, and L above four hundred feet. A series of maps printed upon plain or suitable paper or other material and exactly similar to Fig. 1 is taken. There should be as many maps as there are contour-lines. For example, the first contour-line is that which indicates the outlines of territory less than fifty feet in altitude, while the last line incloses altitudes higher than four hundred feet, there being in all nine of such contour-lines. I therefore take nine maps so provided with contour-lines and so printed. I now cut from one of such maps the portion inclosed by the fifty-foot contour-line and remove such portion of the map, leaving all the parts indicating higher altitudes in position. I now cut out on a second map all the territory included within the one-hundred-foot contour-line and place the remaining portion of the map indicating altitudes of more than one hundred feet upon the remains of the first map, properly positioning these parts one upon the other, as indicated by the contour-lines on the printed map. In like manner I proceed until, having destroyed the nine maps, I have a single map or body built up of the fragments in which the portions having higher altitudes lie successively above the others in strict accordance with the general law of the difference in altitude in various portions of the country thus to be mapped. It will be readily observed that since the map portions are of wax the edges may be worked down suitably by hand or otherwise, so as to form a smooth surface, as indicated in Fig. 3. Proceeding now in exactly the opposite manner as to the cutting and arranging of the parts, I build up the reverse of such mold, as indicated in Fig. 4. The appearance of the sections when they are so cut out is indicated in Figs. 5 and 6. Having thus obtained these bodies or portions of the molds indicated in Figs. 3 and 4, it will be readily seen that they may be used in any suitable manner to cast the plates between which the relief-maps are to be made or pressed. I prefer to use the two portions of the mold so formed for the purpose of casting plates, electrotype or other, and such plates being properly filled in and backed up to press the map directly from them. It will of course be understood that the illustrations offered are greatly exaggerated for the purpose of giving a more complete idea of the method employed; also, that the two molds or portions of molds may be built up of one set of mutilated maps, the parts rejected for one portion of mold being used for the opposed portion.

The substance of which the maps are to be made from which the forms are to be constructed is wax of a suitable character, and this is spe cially desirable because it is so easily cut along the contour-lines. In the event of the use of any other material than some form of wax the cutting of the contour-lines would be a matter of considerable difficulty, since they are very irregular and cannot, of course, be cut according to any given pattern or form. Another important result obtained by the use of the wax is that the plates or map-sections when built up together can be readily and easily smoothed down. Thus where two lines are close together a very abrupt departure from one to the other takes place, and it would be difficult in a map having such irregularities as are incident to greatly-varying distances between the succeeding contour-lines to finish the form so as to produce a smooth printing or pressing surface without smoothing down the wax so as to produce such surface. It is apparent that great difficulty would attend such finishing and smoothing down in the case of anything but plastic material.

The sections of the maps, which are each cut along one contour-line, are each evidently capable of being buit up so that one form is what might be called a "negative" and the other one a "positive" form, or, in other words, so that when placed together they keep the same position as if they had originally, without such cutting, been placed one upon the top of the other, or, in other words, one form is male and the other female.

What I desire to claim is the following:

The method of making relief-maps, which consists in, first, impressing the contour-lines of a country on a series of wax plates, the number of plates being equal to the number of lines on each map; second, cutting such plates each along its contour-line; third, building out of the sections so formed by successively superimposing them suitable positive and negative forms; fourth, finishing and smoothing the surface of such wax forms and the edges of the sections according to the topography of the country to be indicated, so as to give smooth surfaces of wax, as shown; fifth, forming pressure-plates, positive and negative, on such forms; sixth, pressing a printed map of paper into relief between such positive and negative forms, and, seventh, backing such printed relief-map as required, all substantially as shown and described.

JOSEPH E. BLANTHER.

Witnesses:
CELESTE P. CHAPMAN,
DAVIDA J. JOHNSON.